United States Patent
Cowan

[15] 3,655,226
[45] Apr. 11, 1972

[54] BEARING ASSEMBLY

[72] Inventor: Lee R. Cowan, Gastonia, N.C.

[73] Assignee: C.R.C. Industries, Gastonia, N.C.

[22] Filed: Aug. 3, 1970

[21] Appl. No.: 60,691

[52] U.S. Cl..........................287/119, 308/174, 242/129.51
[51] Int. Cl..................................................F16b 7/00
[58] Field of Search...................308/174, DIG. 10, DIG. 11; 242/129.51, 68.4; 287/119

[56] References Cited

UNITED STATES PATENTS

| | | | |
|---|---|---|---|
| 1,265,995 | 5/1918 | Cargal et al. | 242/129.51 |
| 2,717,071 | 9/1955 | Cook | 204/272 |
| 2,529,231 | 11/1950 | Smith | 308/174 X |
| 2,566,894 | 9/1951 | Kaczmarck | 308/174 X |
| 466,445 | 1/1892 | Simonds | 308/174 |

*Primary Examiner*—Andrew V. Kundrat
*Attorney*—Parrott, Bell, Seltzer, Park & Gibson

[57] ABSTRACT

A bearing assembly for axially and radially supporting a rotatable shaft, and wherein the bearing may be easily removed and replaced. The assembly includes a housing having a socket mounting an annular roller bearing, and a shaft having one end adapted to enter the socket and be radially supported by the roller bearing. The hosing mounts a ball bearing at the inner end of the socket which is adapted to engage the forward end wall of the shaft to axially support the same. A resilient annular ring cooperatively engages annular grooves positioned on the shaft and in the housing wall in the socket to form a quick disconnect coupling for releasably connecting the shaft in the socket.

6 Claims, 4 Drawing Figures

Patented April 11, 1972

3,655,226

INVENTOR:
LEE ROY COWAN

By Parrott, Bell, Seltzer, Park & Gibson
ATTORNEYS

BEARING ASSEMBLY

The present invention relates to a bearing assembly for releasably supporting a rotatable member in both the radial and axial directions.

In many mechanical operations, it is required that one end of a rotatable shaft be mounted in a bearing which is capable of supporting the shaft in both the radial and axial directions. Typically, the bearing includes an outer race carried in a housing, and the shaft is secured to the bearing inner race or some other part of the housing to permanently interconnect the members. In view of this permanent interconnection between the shaft and housing, it is usually impossible to effect removal and replacement of a worn bearing without damaging the housing and possibly even the shaft as well. Thus as a practical manner, the only effective way to replace the worn bearing is to discard both the housing and probably the shaft and to completely replace both of these members.

It is accordingly an object of the present invention to provide a bearing assembly which includes a housing mounting the bearing, and wherein the associated shaft may be releasably secured therein.

It is a further object of the present invention to provide a bearing assembly having provision for the easy replacement of the bearing without damaging the housing or shaft.

It is another object of this invention to rotatably support a shaft in both the axial and radial directions with minimal frictional losses.

These and other objects and advantages of the present invention are achieved in the embodiment illustrated herein by the provision of a bearing housing which includes a generally cylindrical socket in one end, an annular roller bearing carried by the housing in the socket, a shaft having a cylindrical end portion received in the socket and operatively engaging the bearing, and quick disconnect means for releasably connecting the shaft in the socket. The housing carries a ball bearing at the inner end of the socket which is engaged by the shaft end portion to limit the inward movement of the shaft in the socket, and in the illustrated embodiment, the quick disconnect means includes a resilient annular ring and cooperating annular grooves in the housing within the socket and on the shaft end portion. The ring and grooves are suitably positioned relative to each other such that the ring effects interengagement when the end portion of the shaft engages the ball bearing at the end of the socket.

Some of the objects and advantages of the invention having been stated, others will appear as the description proceeds, when taken in connection with the accompanying drawings, in which ---

Figure 1:
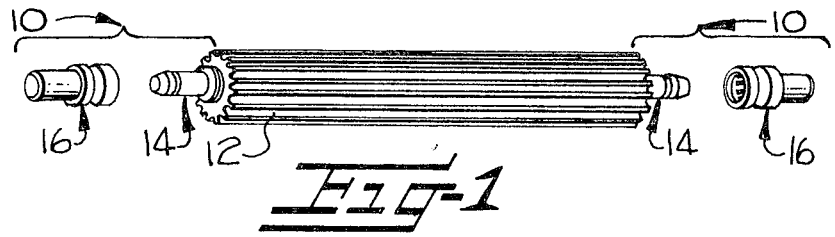
FIG. 1 is an exploded perspective view illustrating the present invention employed in conjunction with a fluted roll of a textile drawing frame.
Figure 2:
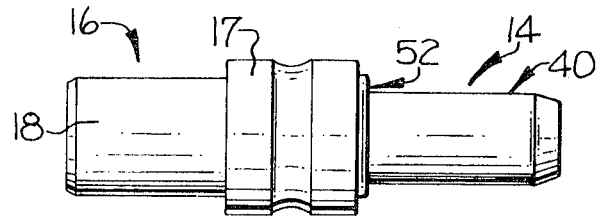
FIG. 2 is a side elevational view of the bearing assembly of the present invention and shown with the shaft connected in the bearing housing.

Referring more specifically to the drawings, FIG. 1 illustrates a bearing assembly 10 embodying the features of the present invention mounted at each end of a fluted roll 12 of a drawing frame as utilized in the textile industry. As will be apparent, the present invention is suitable for use in many other applications where a rotatable member is to be supported in both the radial and axial directions, and the drawing frame roll is merely illustrative of one such application.

The bearing assembly broadly comprises a shaft 14 and a supporting bearing housing 16. The external surface of the housing is generally cylindrical and includes an enlarged forward portion 17 and a reduced rear portion 18 adapted to be mounted in a suitable bearing block or the like (not shown). A socket extends axially inwardly into one end of the housing and defines an outer cylindrical socket portion 19 and an inner cylindrical socket portion 20 positioned coaxially with the outer portion 19. In the illustrated embodiment, a counterbore 21 is positioned at the entrance of the socket which defines a shoulder 22 for the purposes hereinafter set forth.

Figure 3:
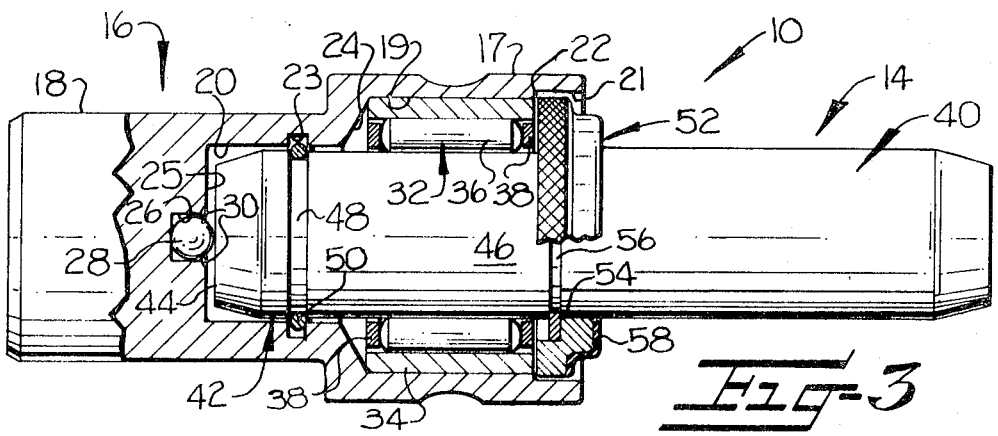
FIG. 3 is an enlarged, partially sectioned, side elevational view of the bearing assembly of the present invention.
Figure 4:
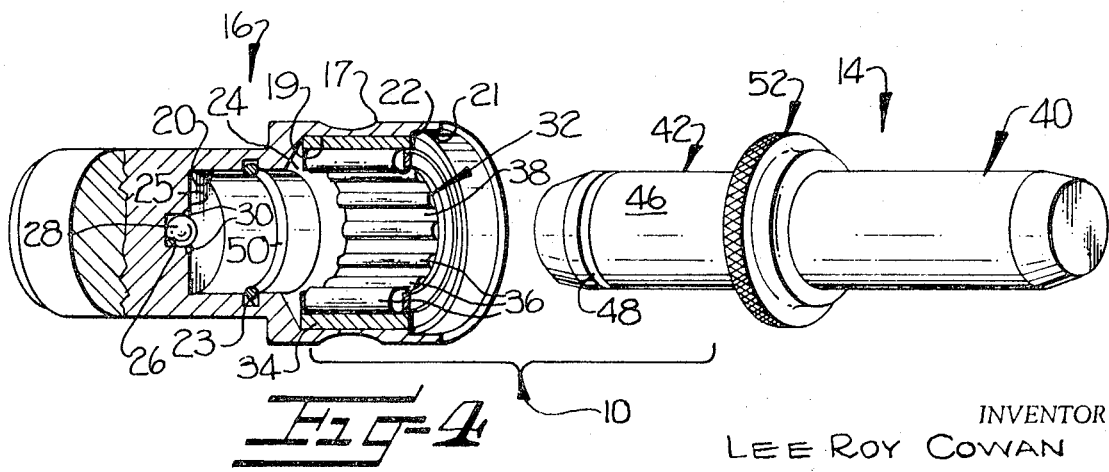
FIG. 4 is an exploded perspective view, partly sectioned, illustrating a shaft withdrawn from the bearing housing.

The inner cylindrical socket portion 20 has a diameter somewhat less than that of the outer portion 19 to define a tapered shoulder 24 therebetween, and an annular groove 23 is positioned in the housing wall within the inner socket portion 20. A transverse bottom or end wall 25 is positioned at the axially inner end of the inner socket portion 20 and includes an axially extending cavity 26 receiving a single ball bearing 28. As best seen in FIG. 3, a portion of the end wall 25 surrounding the cavity 26 is deformed, as at 30, to project radially into the cavity and thereby retain the ball bearing. For reasons to become apparent, the ball bearing 28 is coaxially aligned with the outer and inner cylindrical portions of the socket.

An annular roller bearing 32 is carried by the housing and mounted by a press fit or the like coaxially in the outer socket portion 19. The bearing is of conventional design and includes an outer race 34, a plurality of needle-like rollers 36 of substantial axial dimension, and a suitable cage 38. Viewing FIG. 3, it will be noted that the outer edge of the bearing is substantially coextensive with the shoulder 22.

The shaft 14 has one end portion 40 adapted to be secured to a rotatable member, such as the drafting roll 12 as shown in FIG. 1, and an opposite end portion 42 adapted to be received in the socket. The end portion 42 includes a forward transverse end wall 44 and a cylindrical portion 46. The cylindrical portion 46 includes an annular groove 48 which will be seen to underlie the groove 23 in the housing when the shaft is fully inserted into the socket. A resilient annular ring 50, which may be split, and either carried by the shaft or retained in the groove 23, is adapted to be partially received in both the groove 23 and groove 48 when the end wall 44 engages the ball bearing 28 to thereby releasably connect the shaft in the socket. In this configuration, it will be apparent that the ball bearing 28 is coaxially aligned with the shaft 14.

A collar 52 is fixedly mounted on the shaft 14 approximately midway along its length. By design, the collar is positioned at a location on the shaft whereby it enters the counterbore 21, and is positioned closely adjacent the roller bearing 32 and shoulder 22 when the shaft is assembled in the housing socket. By this arrangement, the collar serves to substantially close the socket to prevent the loss of bearing lubricant. Also the collar tends to prevent foreign materials such as textile lint from entering the bearing from the outside.

To facilitate the accurate placement of the collar 52 on the shaft 14, a split ring retainer 54 is carried in an annular groove 56 in the shaft. Thus to assemble the collar on the shaft, the collar is press fit thereon to abut the ring 54. The outer exposed side of the collar facing away from the end portion 42, and thus toward the drafting roll 12, includes a coating 58 of a rubber-like material secured thereto. The coating assures the avoidance of metal to metal contact between the collar and roll 12.

From the above description, it will be apparent that the shaft 14 may be quickly and easily assembled and disassembled from the housing 16. In particular, the shaft may be axially inserted into the socket of the housing until the end wall 44 abuts the ball bearing 28. At this point, the annular ring 50 carried by the housing in groove 23 prevents the inadvertent withdrawal of the shaft by partially entering the groove 48 on the shaft. The contact with the ball bearing 28 precludes inward axial movement of the shaft 14, and contact with the roller bearing 32 prevents radial movement. To withdraw the shaft 14 from the housing, it is merely necessary to exert sufficient rearward axial force to overcome the resistance of the ring 50. If after long use, it should become necessary to replace the bearing 32, it is only necessary to withdraw the shaft 14 and remove the bearing from the outer cylindrical portion 19 in a conventional manner. A new bearing may then be inserted, and the shaft 14 replaced in the socket. Thus, provision is made for the easy replacement of the bearing 32, without the need for replacing either the shaft or housing.

In the drawings and specification, there has been set forth a preferred embodiment of the invention, and although specific terms are employed, they are used in a generic and descriptive sense only and not for purposes of limitation.

I claim:

1. A bearing assembly comprising
   a bearing housing including a generally cylindrical socket extending axially into one end thereof and defining an axially inner portion and an axially outer portion,
   an annular bearing carried by the housing in said socket outer portion,
   a shaft having an end portion positioned in said socket in operative engagement with said annular bearing and extending into said socket inner portion,
   friction reducing, thrust bearing means carried by said housing in said socket inner portion for engaging said shaft end portion to limit inward movement of said shaft in said socket,
   quick disconnect coupling means positioned in said socket in the housing for releasably connecting said shaft therein,
   a collar mounted on said shaft for rotation therewith and in sealing engagement therewith and extending at least partially into the socket and having an external diameter relative to the internal diameter of the outer end of said socket whereby said collar substantially closes the outer end of said socket to substantially prevent the entry of foreign matter into the socket, and
   means carried by said shaft and operatively engageable with said collar for preventing axial movement of said collar inwardly of said housing.

2. The bearing assembly as defined in claim 1 wherein said quick disconnect coupling means comprises an annular groove in said shaft end portion, an annular groove in said housing in said socket inner portion, and a cooperating resilient ring having portions thereof extending into both grooves.

3. The bearing assembly as defined in claim 1 wherein said thrust bearing means comprises a ball bearing cooperatively engaging said shaft end portion.

4. The bearing assembly as defined in claim 3 wherein said ball bearing is positioned coaxially with said shaft.

5. The bearing assembly as defined in claim 1 wherein said annular bearing comprises a plurality of cylindrical rollers of substantial length.

6. The bearing assembly as defined in claim 1 wherein said collar includes a transverse side facing away from said socket, said side including a coating of rubber-like material to permit mounting of a rotatable member on said shaft in close proximity to said collar without physical contact therebetween.

* * * * *